United States Patent
Kuwabara et al.

(10) Patent No.: US 9,191,589 B2
(45) Date of Patent: Nov. 17, 2015

(54) IMAGE PROCESSING DEVICE

(71) Applicant: Hitachi Kokusai Electric Inc., Tokyo (JP)

(72) Inventors: Munemitsu Kuwabara, Tokyo (JP); Wataru Ito, Tokyo (JP); Madoka Tanaka, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 14/363,408

(22) PCT Filed: Nov. 29, 2012

(86) PCT No.: PCT/JP2012/080883
§ 371 (c)(1),
(2) Date: Jun. 6, 2014

(87) PCT Pub. No.: WO2013/084782
PCT Pub. Date: Jun. 13, 2013

(65) Prior Publication Data
US 2014/0320682 A1 Oct. 30, 2014

(30) Foreign Application Priority Data

Dec. 9, 2011 (JP) ................................. 2011-270130

(51) Int. Cl.
*H04N 5/357* (2011.01)
*H04N 5/232* (2006.01)
(Continued)

(52) U.S. Cl.
CPC ................ *H04N 5/357* (2013.01); *G06T 5/003* (2013.01); *G06T 7/204* (2013.01); *G06T 7/2066* (2013.01);
(Continued)

(58) Field of Classification Search
CPC .............. H04N 5/357; H04N 5/23229; H04N 5/23251; H04N 5/23254; G06T 5/002; G06T 5/003; G06T 7/2033; G06T 7/204
See application file for complete search history.

(56) References Cited

U.S. PATENT DOCUMENTS

2009/0297059 A1* 12/2009 Lee et al. ........................ 382/275
2010/0013917 A1* 1/2010 Hanna et al. ................... 348/143
(Continued)

FOREIGN PATENT DOCUMENTS

JP   H3-95686 A   4/1991
JP   4040651 B   1/2008
(Continued)

OTHER PUBLICATIONS

English translation of International Search Report.
(Continued)

*Primary Examiner* — Daniel M Pasiewicz
(74) *Attorney, Agent, or Firm* — Bacon & Thomas, PLLC (57) ABSTRACT

An image processing device 102 includes a background-object reference image estimation unit 1, a background-object optical flow calculation unit 2, moving-object reference image estimation units 4 and 9, moving-object heat-haze fluctuation calculation units 5, 6, 7, 10 and 11, and a motion correction unit 3. The image processing device 102 is configured such that optical flow of a background object and heat-haze fluctuation of a moving-object are obtained from input images inputted in succession, partial images of the input images are moved so as to cancel the heat-haze fluctuation, and a corrected image, which has the heat-haze fluctuation upon the background object and the moving-object within the input images removed, is generated.

11 Claims, 12 Drawing Sheets

(51) Int. Cl.
*G06T 7/20* (2006.01)
*G06T 5/00* (2006.01)

(52) U.S. Cl.
CPC ....... *H04N 5/23229* (2013.01); *H04N 5/23254* (2013.01); *G06T 2207/10004* (2013.01); *G06T 2207/20201* (2013.01); *H04N 5/23267* (2013.01)

(56) References Cited

U.S. PATENT DOCUMENTS

2011/0131824 A1* 6/2011 Yanobe et al. .................. 33/292
2012/0200720 A1* 8/2012 Holmlund .................. 348/208.1
2013/0070967 A1* 3/2013 Genc et al. .................... 382/103

FOREIGN PATENT DOCUMENTS

| JP | 2011-197755 A | 10/2011 |
| JP | 2011-229030 A | 11/2011 |
| JP | 2012-104018 A | 5/2012 |
| JP | 2013246601 A * | 12/2013 |

OTHER PUBLICATIONS

Hajime Sonehara, "Motion Detection in consideration of a Boundary of Moving Object", ITEJ Technical Report, Nov. 17, 1995, vol. 19, No. 62, pp. 61 to 68.

* cited by examiner

REFERENCE IMAGE OF BACKGROUND OBJECT

FIG. 6B

INPUT IMAGE

FIG. 6C

SAMPLE POINT

OPTICAL FLOW OF BACKGROUND OBJECT

IMAGE PROCESSING DEVICE

FIELD OF THE INVENTION

The present invention relates to an image processing device, and more particularly to an image processing device capable of improving the quality of an image when the image captured by a camera or the like is degraded by fluctuation due to the heat haze.

BACKGROUND OF THE INVENTION

Recently, there have been proposed many image processing methods for improving degradation in image quality (restoring the image quality) when an image of an object captured by a camera or the like is degraded to allow the object to be favorably perceived.

In, this regard, conventional techniques are disclosed in Patent Document 1 and Patent Document 2 (referred to as Conventional Technique 1 and Conventional Technique 2). Conventional Technique 1 discloses a fluctuation noise reduction processing method in which image deterioration such as blur of an image is small by extracting fluctuation components present in continuous images in time series as motion vectors between images, tracking the motion vectors to obtain a center of fluctuation, and rearranging partial images or pixels becoming a starting point of the fluctuation in the center position. Further, Conventional Technique 2 discloses a technique of correcting distortion of an image due to fluctuation of a monitoring camera in real time, and identifying a moving object of interest in the moving image online. Further, the inventors of the present patent application have filed, as Japanese Patent Application No. 2010-253727 (Japanese Patent Application Publication No. 2012-104018) (Conventional Technique 3), a technique for improving the quality of an image by calculating optical flow for input images and a reference image which is a time average of the input images, calculating local fluctuations (motion vectors) of the input images, and moving partial images of the input images so as to cancel the heat haze fluctuation using the motion vectors.

Patent Document 1: Japanese Patent Application Publication No. H3-95686

Patent Document 2: Japanese Patent No. 4040651

According to Conventional Techniques 1 to 3, in a case where the quality of an image is degraded due to camera shake, heat haze or the like when the image is captured by a camera, it is possible to improve the image quality degradation of a background object and obtain a favorable image. However, there is a problem that it is impossible to correct the fluctuation of the heat haze on a moving object.

SUMMARY OF THE INVENTION

In view of the above, an object of the present invention is to provide a an image processing device capable of correcting the fluctuation of the heat haze on a moving object as well as a background object to obtain a favorable image.

An image processing device of the present invention, for processing an image captured by an image pickup device for capturing an image of a target area, includes: a background object reference image estimation unit configured to estimate a reference image of a background object with no motion based on input images inputted sequentially from the image pickup device; a background object optical flow calculation unit configured to calculate an optical flow of the background object by calculating local fluctuations of the input images based on the input images and the reference image of the background object; a moving object reference image estimation block configured to estimate a reference image of a moving object with motion based on input images inputted sequentially from the image pickup device; a moving object heat haze fluctuation calculation block configured to calculate a fluctuation due to heat haze on the moving object in the input images based on the input images and the reference image of the moving object; and a motion correction unit configured to correct the input images by using the optical flow calculated by the background object optical flow calculation unit and the fluctuation due to heat haze on the moving object calculated by the moving object heat haze fluctuation calculation unit to remove the local fluctuations in the input images.

Further, the moving object reference image estimation block may include a moving object detection unit for detecting the moving object by calculating a difference flow of the input images inputted sequentially from the image pickup device, and a moving object reference image estimation unit for creating an average image of the detected moving object as the reference image of the moving object.

Further, the moving object heat haze fluctuation calculation block may include a reference moving object fluctuation calculation unit for calculating a fluctuation of the moving object for reference at each point of interest on the moving object, a reference moving object fluctuation average value calculation unit for calculating an average value of the fluctuation of the moving object for reference, a difference flow average value calculation unit for calculating an average value of the difference flow at each point of interest on the moving object, a moving object flow calculation unit for calculating a flow of the moving object, and a moving object heat haze fluctuation calculation unit for calculating the fluctuation due to heat haze on the moving object at each point of interest.

EFFECT OF THE INVENTION

In accordance with the image processing device of the present invention, it is possible to correct the fluctuation of the heat haze on a moving object as well as a background object, thereby obtaining a favorable image.

DETAILED DESCRIPTION OF THE EMBODIMENTS

Hereinafter, embodiments of the present invention will be described with reference to the drawings.

(Embodiment 1)

As a specific embodiment of the present invention, a monitoring apparatus using an image pickup device such as a camera will be described as an example.

Figure 1:
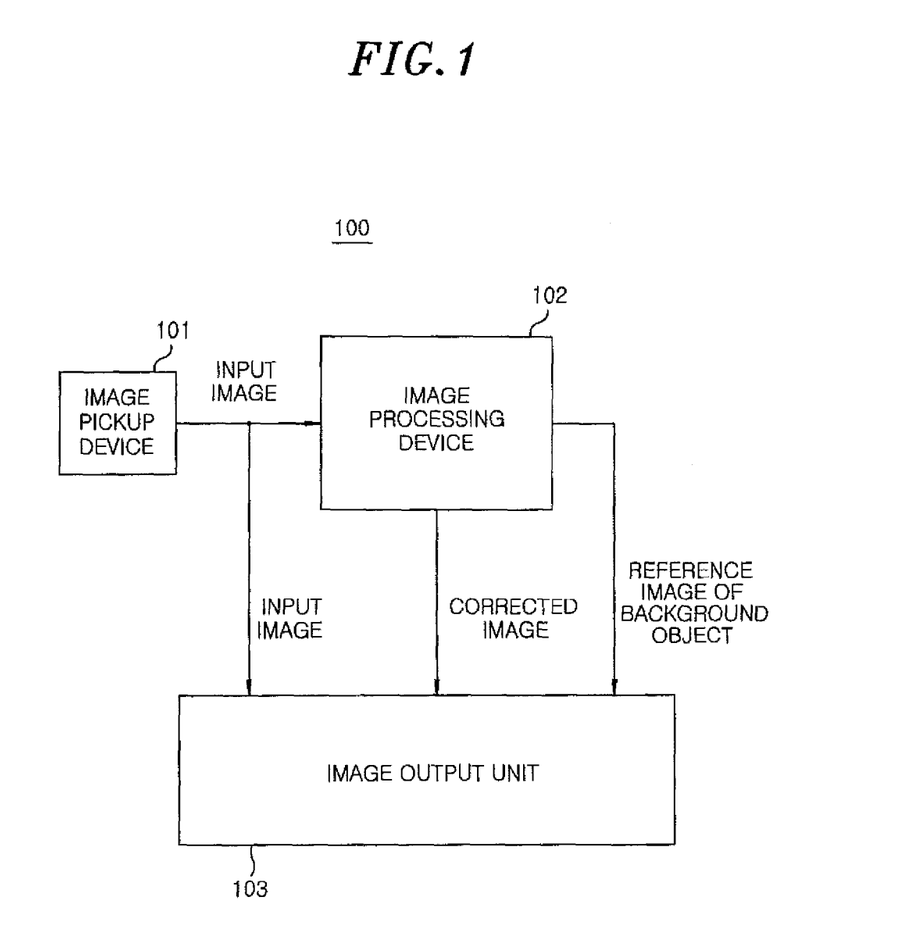
FIG. 1 is a block diagram showing a configuration of a monitoring apparatus to which an image processing device of the present invention is applied.

FIG. 1 is a functional block diagram showing a configuration of a monitoring apparatus 100 to which the present invention is applied. The monitoring apparatus 100 includes: an image pickup device 101 such as a monitoring camera; an image processing device 102 which performs image processing of the present invention on image data inputted from the image pickup device 101; and an image output unit 103 which receives image data (input image) inputted from the image pickup device 101 and image data (reference image data of background objects, corrected image data) outputted from the image processing device 102 and outputs the image data as an image. The image output unit 103 may include a monitor device having a video display unit. Although not shown, the image processing device 102 includes a microcomputer and performs various operations by executing programs stored in a memory to realize the functions which will be described below.

Figure 2:
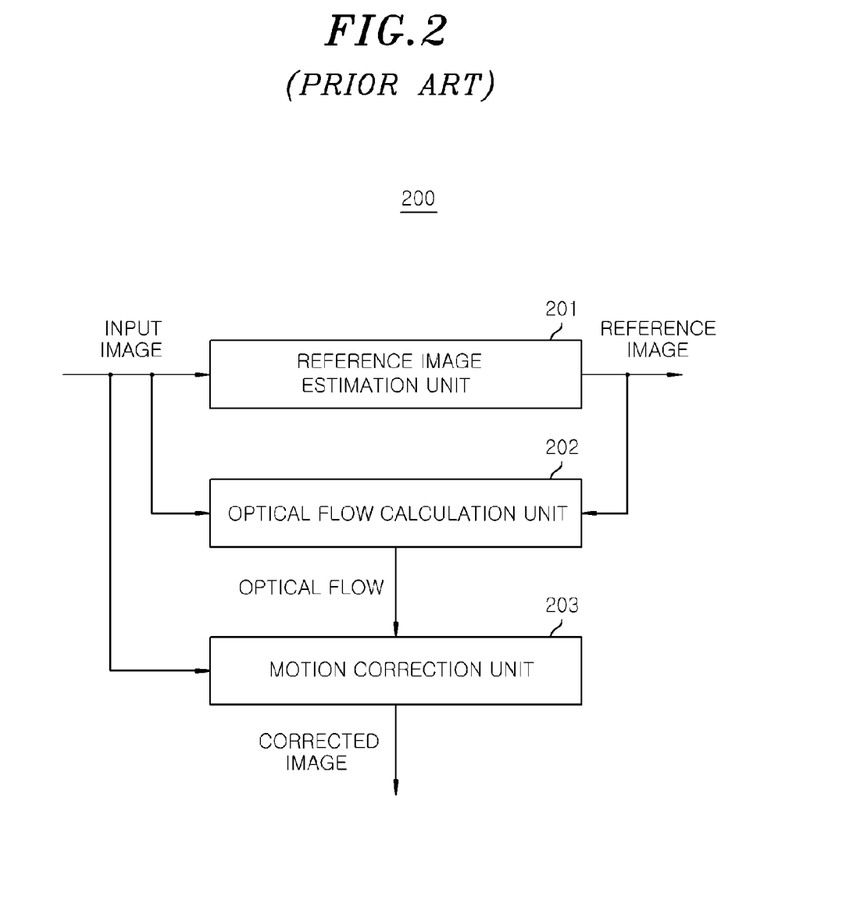
FIG. 2 shows an internal block diagram of a conventional image processing device.

FIG. 2 shows a block diagram of the image processing device described in Japanese Patent Application No. 2010-253727 of Conventional Technique 3, which was filed prior to the filing date of the present invention. The image processing device 200 of Conventional Technique 3 in FIG. 2 includes a reference image estimation unit 201, an optical flow calculation unit 202 and a motion correction unit 203. The image processing device 200 of Conventional Technique 3 corrects fluctuation due to the heat haze of a background object, but does not include a function of correcting fluctuation due to the heat haze on a moving object. The present invention has a configuration shown in FIG. 3 to further include the function of correcting fluctuation due to the heat haze on a moving object in the image processing device 200 of Conventional Technique 3.

Figure 3:
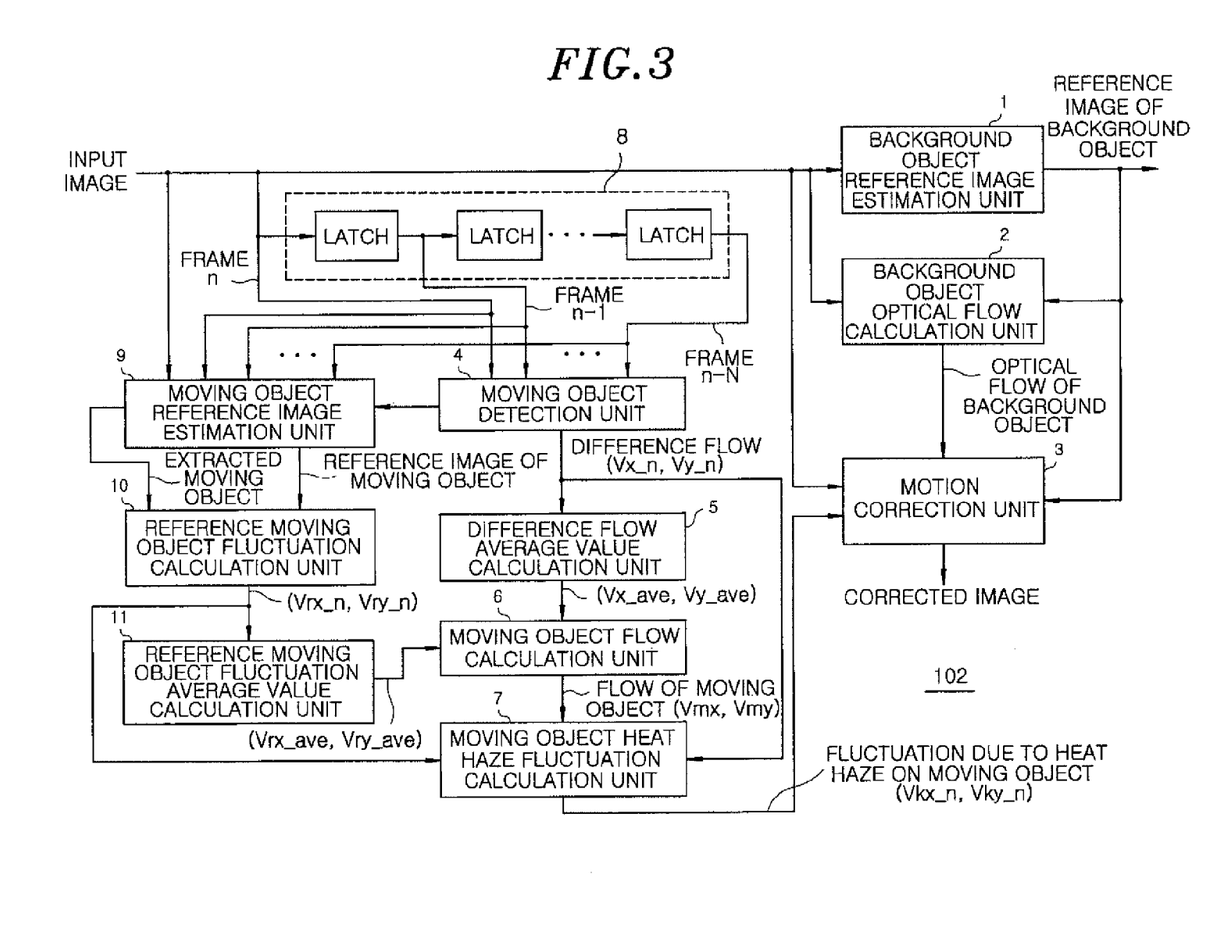
FIG. 3 illustrates an example of an internal block diagram of the image processing device of the present invention.

FIG. 3 illustrates an example of an internal block diagram of the image processing device 102 of the present embodiment. A background object reference image estimation unit 1 has the same function as the reference image estimation unit 201 of Conventional Technique 3. Further, a background object optical flow calculation unit 2 has the same function as the optical flow calculation unit 202 of Conventional Technique 3. A motion correction unit 3 is a unit corresponding to the motion correction unit 203 of Conventional Technique 3, but, unlike the motion correction unit 203 of Conventional Technique 3, has a function of correcting both fluctuation due to the heat haze of a background object and fluctuation due to the heat haze on a moving object.

In addition to the background object reference image estimation unit 1, the background object optical flow calculation unit 2 and the motion correction unit 3, the image processing device 102 of the present embodiment includes a moving object detection unit 4, a difference flow average value calculation unit 5, a moving object flow calculation unit 6, a moving object heat haze fluctuation calculation unit 7, a latch 8, a moving object reference image estimation unit 9, a reference moving object fluctuation calculation unit 10, and a reference moving object fluctuation average value calculation unit 11.

Figure 4:
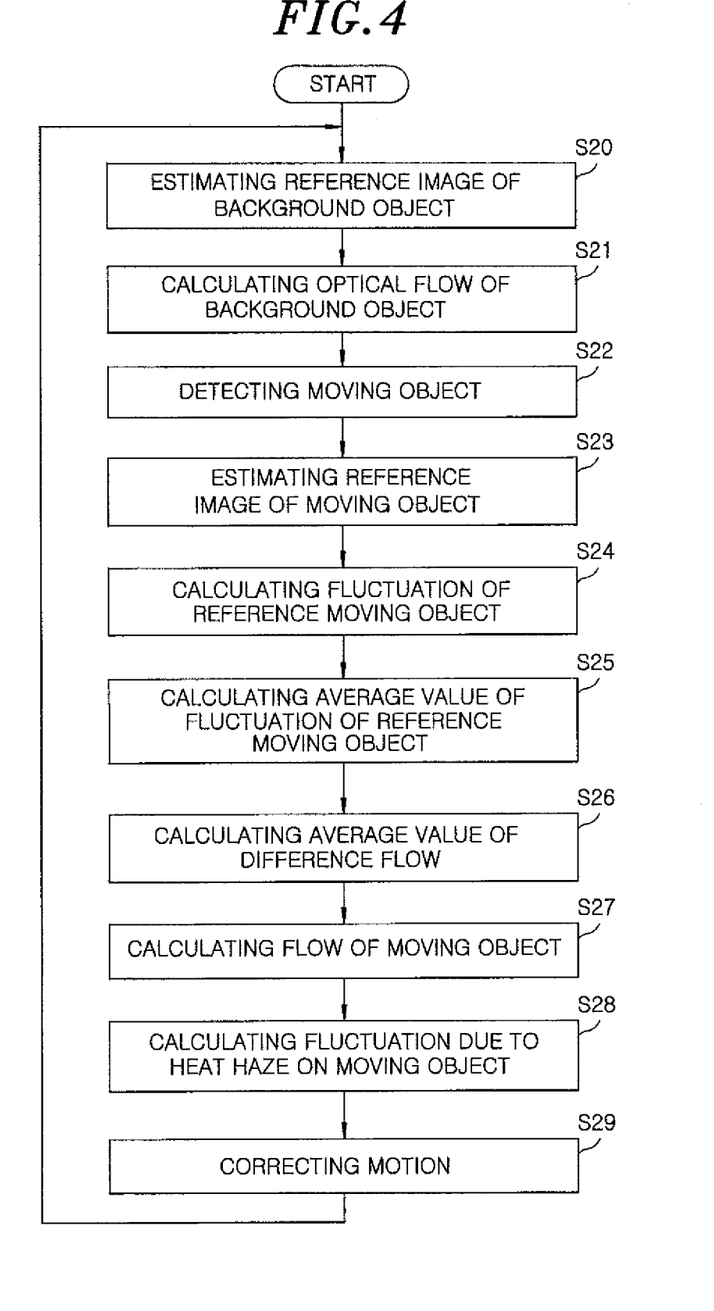
FIG. 4 shows an example of an operation flow of the image processing device of the present invention.

FIG. 4 shows an example of an operation flowchart of the image processing device 102 of the present embodiment. The operation of the background object reference image estimation unit 1 is performed in step S20 of estimating a reference image of a background object. The operation of the background object optical flow calculation unit 2 is performed in step S21 of calculating optical flow of the background object. The operation of the moving object detection unit 4 is performed in step S22 of detecting a moving object. The operation of the moving object reference image estimation unit 9 is performed in step S23 of estimating a reference image of the moving object. The operation of the reference moving object fluctuation calculation unit 10 is performed in step S24 of calculating fluctuation of a moving object for reference. The operation of the reference moving object fluctuation average value calculation unit 11 is performed in step S25 of calculating an average value of fluctuation of the moving object for reference. The operation of the difference flow average value calculation unit 5 is performed in step S26 of calculating an average value of difference flow. The operation of the moving object flow calculation unit 6 is performed in step S27 of calculating flow of the moving object. The operation of the moving object heat haze fluctuation calculation unit 7 is performed in step S28 of calculating fluctuation due to the heat haze on the moving object. The operation of the motion correction unit 3 is performed in step S29 of correcting motion. Hereinafter, the operation of each processing unit will be described.

First, in step S20 of estimating a reference image of a background object, the background object reference image estimation unit 1 estimates an image (reference image of the background object) with no motion from input images inputted sequentially from the image pickup device 101 such as a camera. The operation will be described with reference to FIG. 5.

Figure 5:
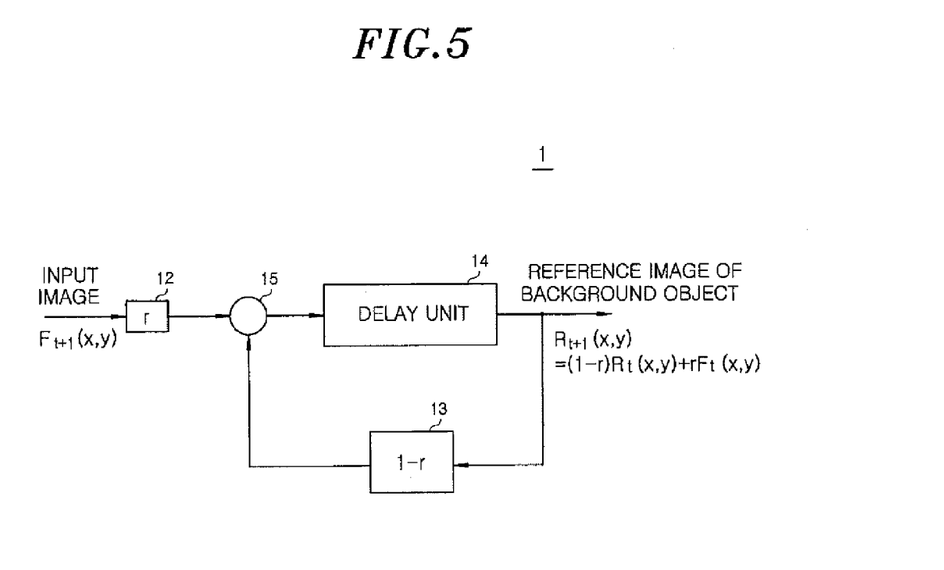
FIG. 5 is an internal block diagram of a background object reference image estimation unit of the present invention.

An image $F_t(x, y)$ inputted at a time t is inputted to a gain block 12 to be multiplied by r. On the other hand, a reference image $R_t(x, y)$ of the background object at the time t outputted from a delay unit 14 is multiplied by $1-r$ in a gain block 13. The weighted output values of the gain block 12 and the gain block 13 are added by an adder 15. Then, the output value of the adder 15 is inputted to the delay unit 14, and the delay unit 14 updates and outputs the data as a reference image $R_{t+1}(x, y)$ of the background object in the next frame (time $t+1$). In this case, r in the gain blocks 12 and 13 is a weight value, which is a constant between 0 and 1. Further, the delay unit 14 holds an image for a time interval of one frame. Accordingly, the reference image of the background object calculated in the background object reference image estimation unit 1 is expressed by Eq. 1:

$$R_{t+1}(x,y) = r \times F_t(x,y) + (1-r) \times R_t(x,y) \qquad \text{Eq. 1}$$

Eq. 1 is called an exponential moving average, and high frequency components of the input images inputted sequentially are reduced (averaged). In this case, for example, assuming that the weight value r is 0.01 (1/100), the input image finally weighted and added relative to the reference image of the background object has a weight value which is equivalent to averaging the input images of 100 frames. That is, when the background object reference image estimation unit 1 is executed for each of the input images inputted sequentially, it converges into an image obtained by averaging the input images of the frame number indicated by the weight value r. The image is referred to as a reference image, and the reference image of the background object is an image with no motion in which a moving object, fluctuation and the like are removed from the input images.

Figure 6A:
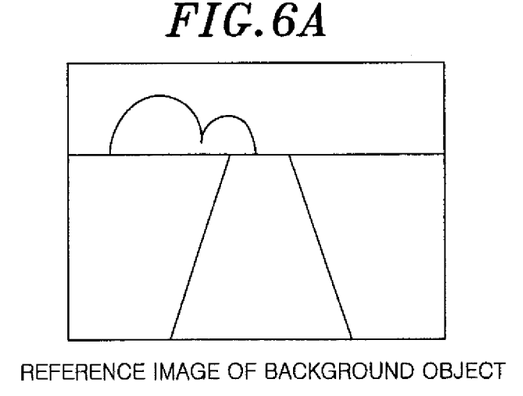
FIGS. 6A to 6C are views for explaining an operation of a background object optical flow calculation unit of the present invention.
Figure 6B:
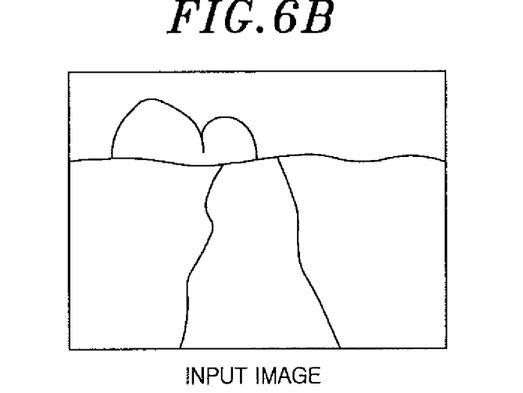
Figure 6C:
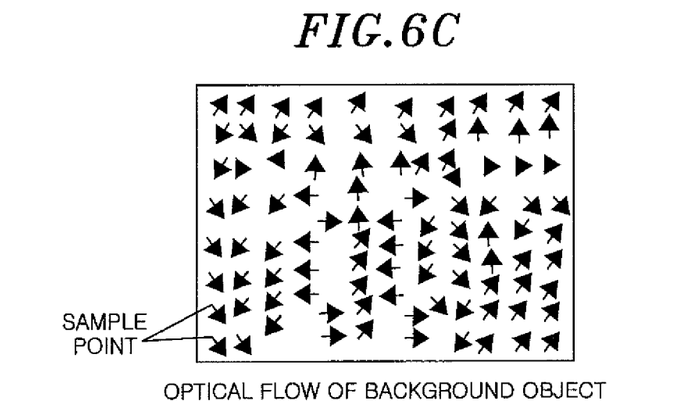

Next, in step S21 of calculating optical flow of the background object, the background object optical flow calculation unit 2 compares the input image with the reference image of the background object, and calculates the optical flow of the background object. The optical flow of the background object represents the distribution of local motion between the two images, which is shown, e.g., in FIG. 6C. FIGS. 6A to 6C are views for explaining the calculation results of the background object optical flow calculation unit 2, wherein FIG. 6A shows a reference image of the background object, FIG. 6B shows an input image, and FIG. 6C shows the optical flow of the background object. As described above, since the reference image of the background object is an image with no motion and the input image is an image which fluctuates due to the heat haze or the like, the optical flow of the background object of the two images shows the distribution with local random motion as shown in FIG. 6C.

As a method of calculating the optical flow of the background object of FIG. 6C, there is a block matching method using a process (template matching process) of searching for a portion in the input image (FIG. 6B) corresponding to the local block pattern (template) of the reference image of the background object (FIG. 6A) based on the similarity of local regions (e.g., 10 vertical pixels and 10 horizontal pixels) of the two images, a gradient method of calculating a motion vector from a spatial gradient of luminance levels of a pixel of interest and a difference of luminance levels of the images of two frames, or the like. By applying these calculations to the pixel of interest (e.g., pixel located at horizontal and vertical spacing of 10 pixels) on the input image (FIG. 6B), it is possible to obtain the distribution of local motions (fluctuations) of the entire input image (FIG. 6B). These methods are widely used in the art.

The background object optical flow calculation unit 2 can calculate local motion between the two images, i.e., the input image (FIG. 6B) and the reference image of the background object (FIG. 6A). That is, it is possible to estimate the amount of fluctuation due to the heat haze in the pixel of interest on the input image (FIG. 6B).

Figure 7:
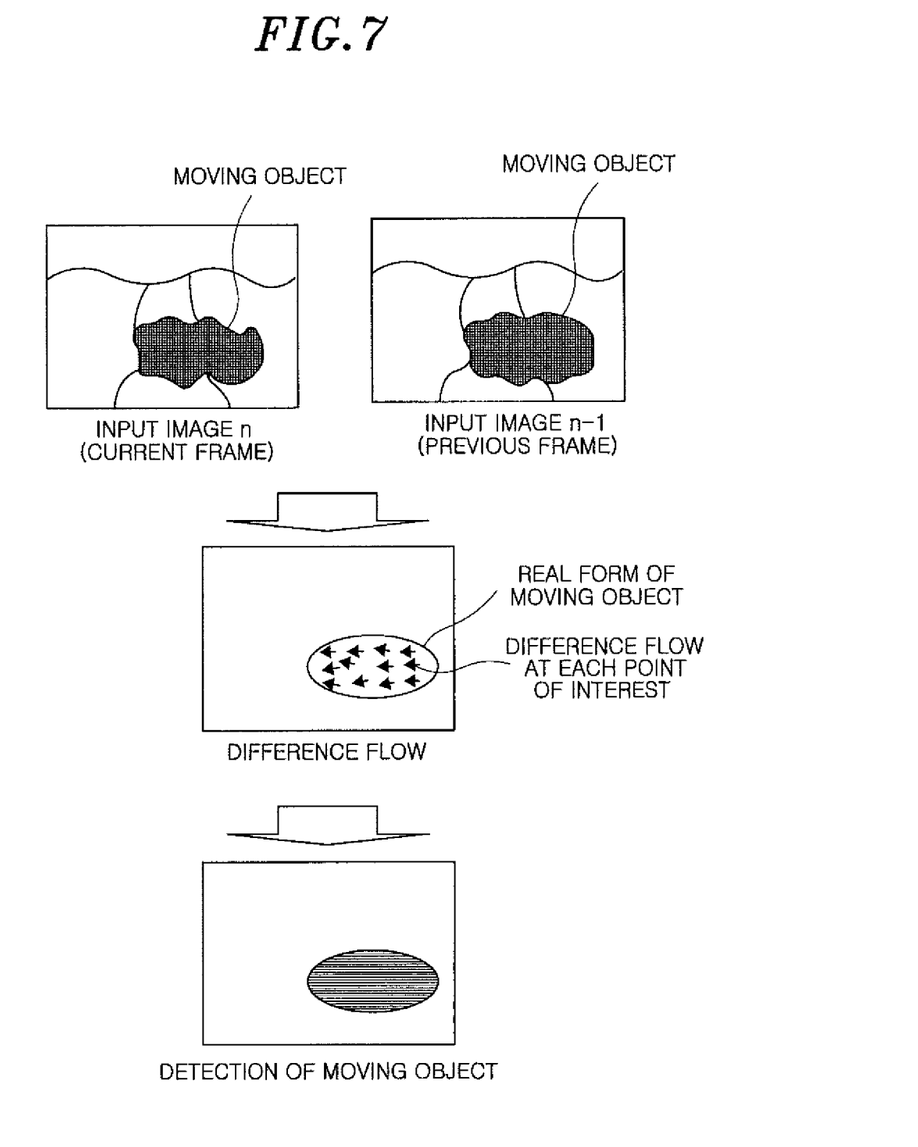
FIG. 7 is a view illustrating an example of the detection of a moving object in accordance with the present invention.

Next, in step S22 of detecting a moving object, an example of an operation of detecting a moving object will be described with reference to FIGS. 3 and 7.

First, the latch 8 stores an input image frame n−1 which is one frame before the current frame, an input image frame n−2 which is two frames before the current frame, . . . , an input image frame n−N which is N frames before the current frame.

The moving object detection unit 4 compares an input image (e.g., input image frame n that is the current frame) with a previous input image (e.g., input image frame n−1 which is one frame before the current frame), calculates the difference flow, determines as a moving object an area where difference flows having the same size in the same direction are present in a certain number of lumps, and sends the location (coordinate data) of the area to the moving object reference image estimation unit 9. Further, the moving object detection unit 4 sends the difference flow (Vx_n, Vy_n) to the difference flow average value calculation unit 5.

Figure 8:
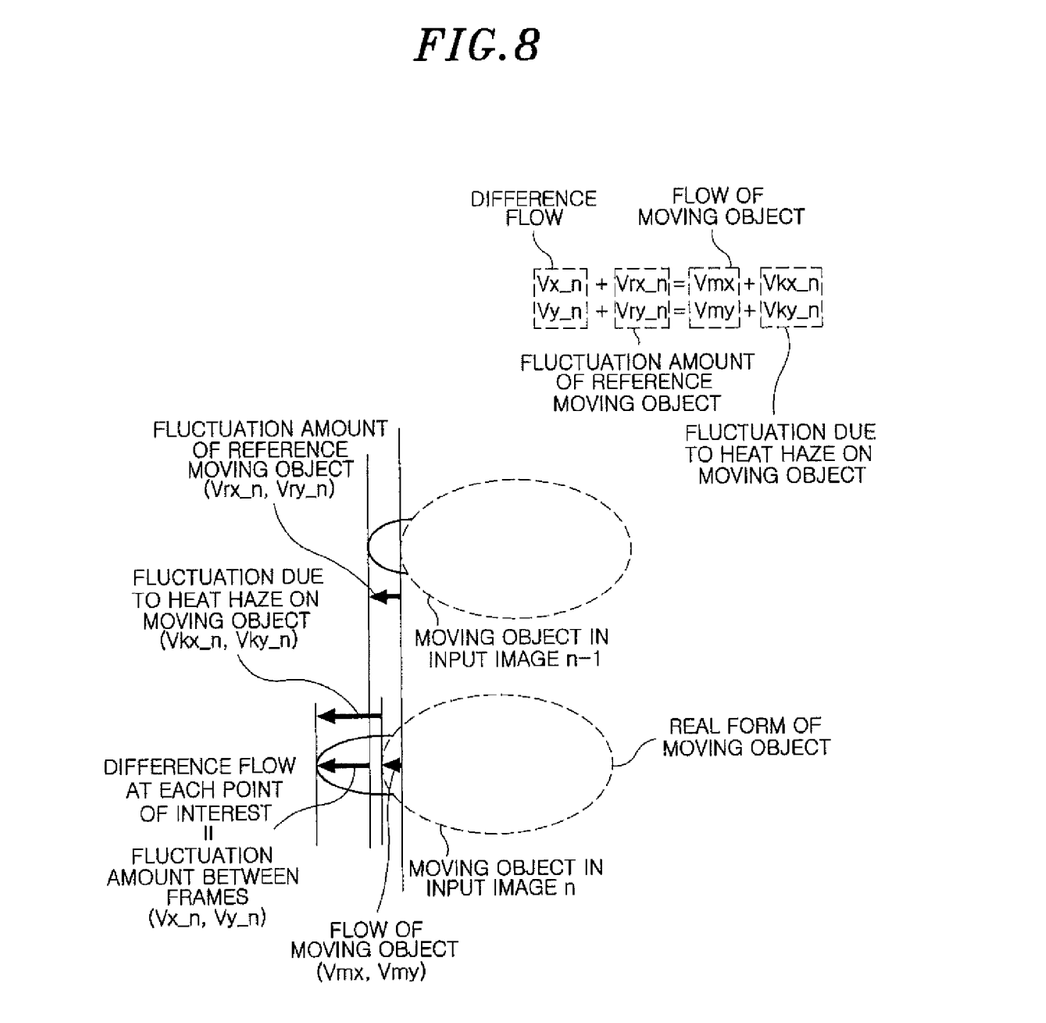
FIG. 8 is a view for explaining relationships between flows of the present invention.

FIG. 8 is a view for explaining relationships between flows of the present invention.

Between the difference flow (Vx_n, Vy_n) at each point (x, y) of interest, the fluctuation (Vrx_n, Vry_n) of the moving object for reference at each point of interest, the flow (Vmx, Vmy) of the moving object, and the fluctuation (Vkx_n, Vky_n) due to the heat haze on the moving object at each point of interest, the following relationship is established.

$$Vx\_n + Vrx\_n = Vmx + Vkx\_n$$

$$Vy\_n + Vry\_n = Vmy + Vky\_n \qquad \text{Eq. 2,}$$

wherein n=0, 1, . . . , N−1.

Figure 9:
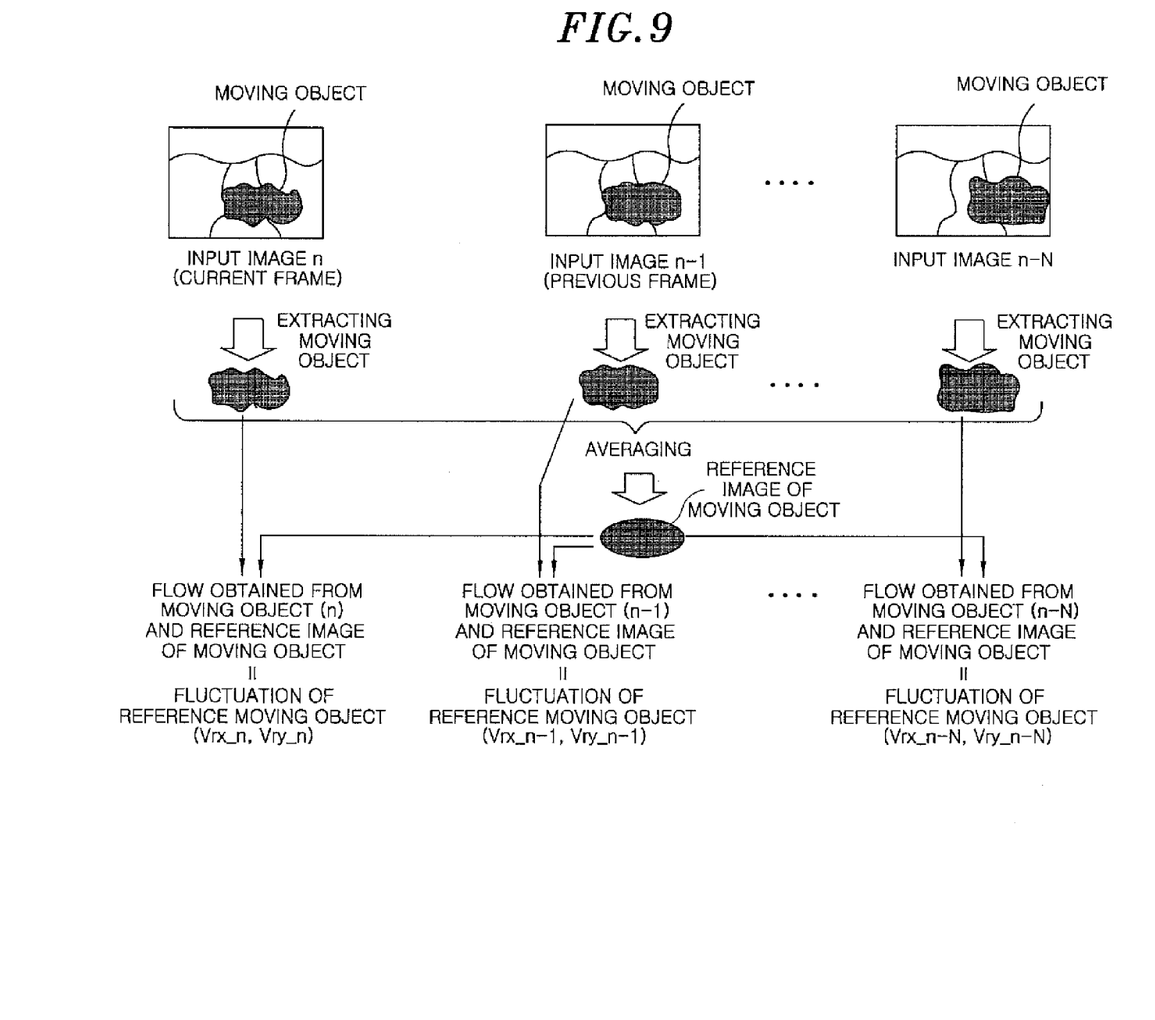
FIG. 9 is a view illustrating an example of the calculation of fluctuation as a reference in accordance with the present invention.

Next, an example of the calculation of the fluctuation as a reference in accordance with the present invention will be described with reference to FIGS. 3 and 9. The moving object reference image estimation unit 9 extracts moving objects from the input image frame n, the input image frame n−1, the input image frame n−2, . . . , the input image frame n−N by using the location (coordinate data) of the moving object in a certain input image, which is sent from the moving object detection unit 4, and creates an average image of the extracted moving objects, which is called a moving object reference image. Further, the extracted moving objects and the moving object reference image are sent to the reference moving object fluctuation calculation unit 10.

The reference moving object fluctuation calculation unit 10 calculates the flow for the moving object reference image by using the extracted moving objects and the moving object reference image received from the moving object reference image estimation unit 9, thereby obtaining the fluctuation (Vrx_n, Vry_n) of the moving object for reference. The fluctuation (Vrx_n, Vry_n) of the moving object for reference is sent to the moving object heat haze fluctuation calculation unit 7 and the reference moving object fluctuation average value calculation unit 11.

The reference moving object fluctuation average value calculation unit 11 calculates the average value (Vrx_ave, Vry_ave) of the fluctuation (Vrx_n, Vry_n) of the moving object for reference at each point of interest in a certain input image n, and sends the average value (Vrx_ave, Vry_ave) to the moving object flow calculation unit 6 and the moving object heat haze fluctuation calculation unit 7.

In addition, the average value (Vrx_ave, Vry_ave) may be calculated by Eq. 3:

$$Vrx\_ave = (Vrx\_0 + Vrx\_1 + \ldots + Vrx\_N{-}1)/N$$

$$Vry\_ave = (Vry\_0 + Vry\_1 + \ldots + Vry\_N{-}1)/N \qquad \text{Eq. 3}$$

Figure 10:
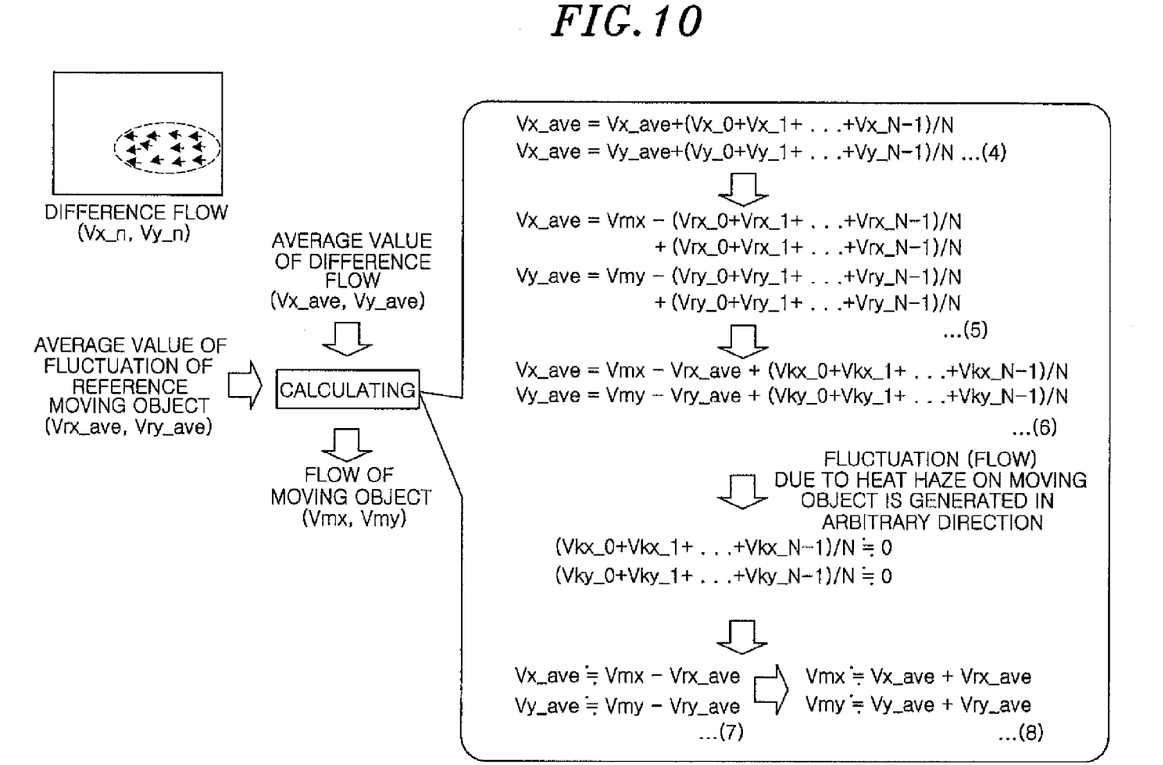
FIG. 10 is a view illustrating an example of the calculation of an average flow of the moving object in accordance with the present invention.

Next, an example of the calculation of the flow of the moving object in accordance with the present invention in the moving object flow calculation unit 6 will be described with reference to FIG. 10.

The average value (Vx_ave, Vy_ave) of the difference flow (Vx_n, Vy_n) at each point of interest may be expressed as in Eq. 4:

$$Vx\_ave = (Vx\_0 + Vx\_1 + \ldots + Vx\_N{-}1)/N$$

$$Vy\_ave = (Vy\_0 + Vy\_1 + \ldots + Vy\_N{-}1)/N \qquad \text{Eq. 4}$$

By using Eq. 2, Eq. 4 may be represented by Eq. 5:

$$Vx\_ave = Vmx - (Vrx\_0 + Vrx\_1 + \ldots + Vrx\_N{-}1)/N + (Vkx\_0 + Vkx\_1 + \ldots + Vkx\_N{-}1)/N$$

$$Vy\_ave = Vmy - (Vry\_0 + Vry\_1 + \ldots + Vry\_N{-}1)/N + (Vky\_0 + Vky\_1 + \ldots + Vky\_N{-}1)/N \qquad \text{Eq. 5}$$

Further, by using Eq. 3, Eq. 5 may be represented by Eq. 6:

$$Vx\_ave = Vmx - Vrx\_ave + (Vkx\_0 + Vkx\_1 + \ldots + Vkx\_N{-}1)/N$$

$$Vy\_ave = Vmy - Vry\_ave + (Vky\_0 + Vky\_1 + \ldots + Vky\_N{-}1)/N \qquad \text{Eq. 6}$$

In this case, since the fluctuation due to the heat haze at each point of interest is generated in an arbitrary direction, the following expression can be considered:

$$(Vkx\_0+Vkx\_1+\ldots+Vkx\_N-1)/N \approx 0$$

$$(Vky\_0+Vky\_1+\ldots+Vky\_N-1)/N \approx 0$$

As a result, Eq. 6 may be expressed as Eq. 7:

$$Vx\_ave \approx Vmx - Vrx\_ave$$

$$Vy\_ave \approx Vmy - Vry\_ave \qquad \text{Eq. 7}$$

From Eq. 7, the flow (Vmx, Vmy) of the moving object may be represented by Eq. 8:

$$Vmx \approx Vx\_ave + Vrx\_ave$$

$$Vmy \approx Vy\_ave + Vry\_ave \qquad \text{Eq. 8}$$

That is, the flow of the moving object can be considered as a value obtained by adding the average value (Vrx_ave, Vry_ave) of the fluctuation amount (Vrx_n, Vry_n) of the moving object for reference to the average value (Vx_ave, Vy_ave) of the difference flow at each point of interest.

The above calculation is performed in the following manner.

The difference flow average value calculation unit 5 calculates the average value (Vx_ave, Vy_ave) of the difference flow at each point of interest by using the difference flow (Vx_n, Vy_n) at each point of interest sent from the moving object detection unit 4, and sends the average value (Vx_ave, Vy_ave) to the moving object flow calculation unit 6.

The moving object flow calculation unit 6 calculates the flow (Vmx, Vmy) of the moving object by using the average value (Vx_ave, Vy_ave) of the difference flow at each point of interest sent from the difference flow average value calculation unit 5, and the average value (Vrx_ave, Vry_ave) of the fluctuation of the moving object for reference sent from the reference moving object fluctuation average value calculation unit 11, and sends the flow (Vmx, Vmy) to the moving object heat haze fluctuation calculation unit 7.

Figure 11:
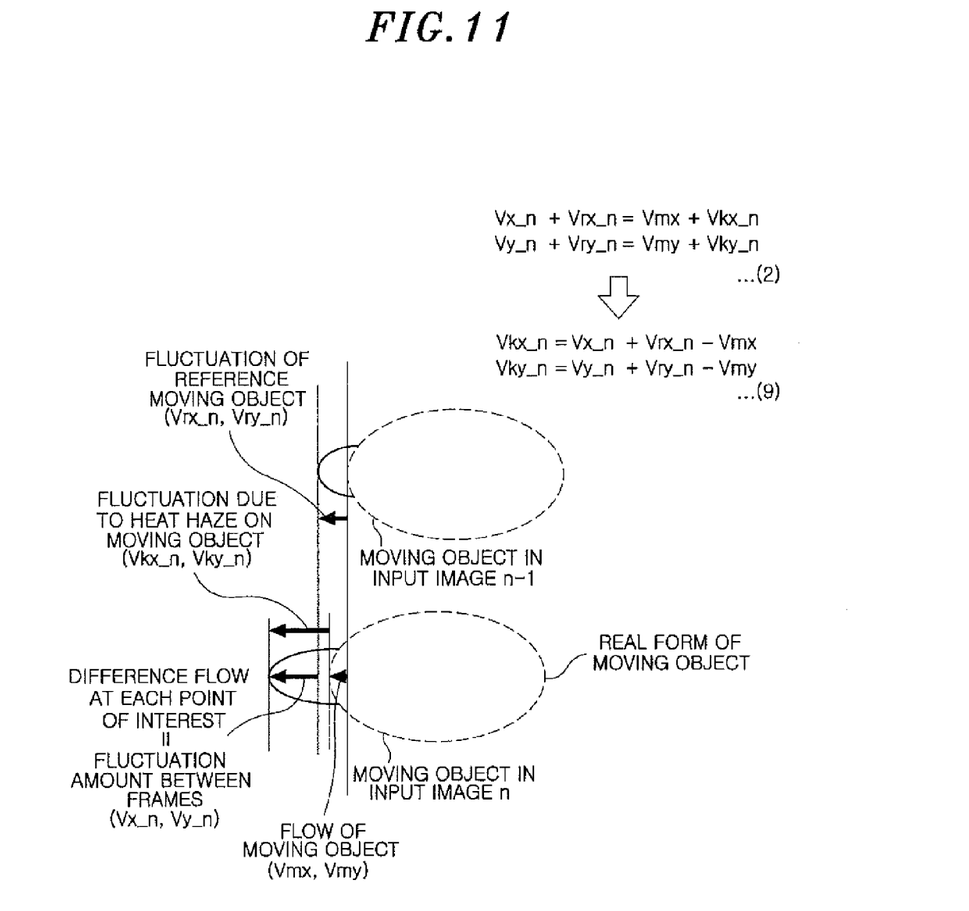
FIG. 11 is a view illustrating an example of the calculation of fluctuation (flow) due to the heat haze on the moving object in accordance with the present invention.

Next, an example of calculation of the fluctuation due to the heat haze on a moving object in accordance with the present invention will be described with reference to FIG. 11.

When Eq. 2 is modified for the fluctuation (Vkx_n, Vky_n) due to the heat haze on the moving object at each point of interest, Eq. 2 may be expressed as Eq. 9.

$$Vkx\_n = Vx\_n + Vrx\_n - Vmx$$

$$Vky\_n = Vy\_n + Vry\_n - Vmy \qquad \text{Eq. 9}$$

That is the fluctuation (Vkx_n, Vky_n) due to the heat haze on the moving object can be calculated when given the difference flow (Vx_n, Vy_n) at each point of interest, the fluctuation amount (Vrx_n, Vry_n) of the moving object for reference, and the flow (Vmx, Vmy) of the moving object.

The above calculation is performed in the following manner.

The moving object heat haze fluctuation calculation unit 7 calculates the fluctuation (Vkx_n, Vky_n) due to the heat haze on the moving object at a point of interest by using the difference flow (Vx_n, Vy_n) sent from the moving object detection unit 4, the flow (Vmx, Vmy) of the moving object sent from the moving object flow calculation unit 6, the fluctuation amount (Vrx_n, Vry_n) of the moving object for reference sent from the reference moving object fluctuation calculation unit 10, and the average value (Vrx_ave, Vry_ave) of the fluctuation of the moving object for reference sent from the reference moving object fluctuation average value calculation unit 11, and sends the fluctuation (Vkx_n, Vky_n) to the motion correction unit 3.

Figure 12:
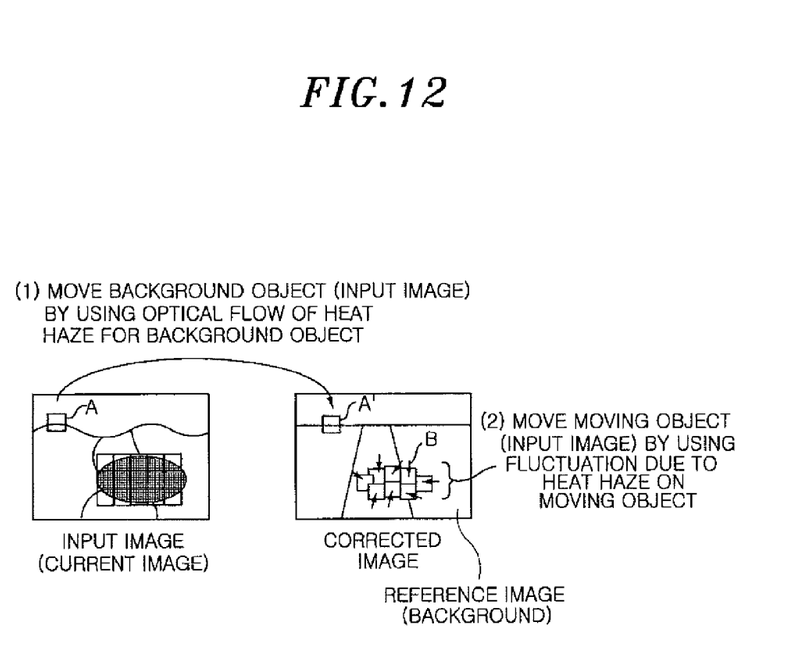
FIG. 12 is a view illustrating an example of motion correction in accordance with the present invention.

Next, an example of motion correction in accordance with the present invention will be described with reference to FIG. 12. (1) First, on the basis of the background object reference image obtained by the background object reference image estimation unit 1, with respect to the background object of the input image, the motion correction unit 3 moves the input image (A→A') by using the optical flow of the heat haze for the background object obtained by the background object optical flow calculation unit 2 based on the background object reference image. (2) Then, with respect to the moving object of the input image, the motion correction unit 3 moves the input image by using the optical flow B, i.e., the fluctuation (Vkx_n, Vky_n) of the heat haze on the moving object, obtained by the moving object heat haze fluctuation calculation unit 7 based on the moving object of the input image.

As described above, the image of the background object (reference image of the background object) with no motion is estimated (A→A') from the input images inputted sequentially, and the optical flow B on the moving object is calculated based on the input image and the reference image of the moving object to calculate a local fluctuation on the moving object in the input image. Then, based on the fluctuation, partial images of the input images are moved to cancel the heat haze fluctuation on the moving object, thereby generating a corrected image in which the heat haze fluctuation on the moving object present in the input image is removed.

The features of the embodiment described above may be summarized as follows. (1) An image processing device of the present invention, for processing an image captured by an image pickup device for capturing an image of a target area, includes: a background object reference image estimation unit configured to estimate a reference image of a background object with no motion based on input images inputted sequentially from the image pickup device; a background object optical flow calculation unit configured to calculate an optical flow of the background object by calculating local fluctuations of the input images based on the input images and the reference image of the background object; a moving object reference image estimation block configured to estimate a reference image of a moving object with motion based on input images inputted sequentially from the image pickup device; a moving object heat haze fluctuation calculation block configured to calculate a fluctuation due to the heat haze on the moving object in the input images based on the input images and the reference image of the moving object; and a motion correction unit configured to correct the input images by using the optical flow calculated by the background object optical flow calculation unit and the fluctuation due to the heat haze on the moving object calculated by the moving object heat haze fluctuation calculation unit to remove the local fluctuations in the input images. (2) Further, the moving object reference image estimation block of (1) may include a moving object detection unit for detecting the moving object by calculating a difference flow of the input images inputted sequentially from the image pickup device, and a moving object reference image estimation unit for creating an average image of the detected moving object as the reference image of the moving object. (3) Further, the moving object heat haze fluctuation calculation block of (2) may include a reference moving object fluctuation calculation unit for calculating a fluctuation (Vrx_n, Vry_n) of a moving object for reference at each point of interest on the moving object, a reference moving object fluctuation average value calculation unit for calculating an average value (Vrx_ave, Vry_ave) of the fluctuation (Vrx_n, Vry_n) of the moving object for reference, a difference flow average value calculation unit for calculating an average value (Vx_ave, Vy_ave) of the difference flow (Vx_n, Vy_n) at each point of interest on the moving object, a moving object flow calculation unit for calculating flow (Vmx, Vmy) of the moving object, and a moving object heat haze fluctuation calculation unit for calculating the fluctuation (Vkx_n, Vky_n) due to the heat haze on the moving object at each point of interest. (4) Further, the moving object detection unit of (2) may compare a current input image frame with a previous frame which is one frame before the current frame by using a plurality of input image frames stored in time series in a latch to calculate the difference flow (Vx_n, Vy_n) and may detect the moving object. (5) Further, the moving object reference image estimation unit of (2) may extract the moving object from a current input image frame and a plurality of input image frames stored in time series in a latch, and may create the average image of the extracted moving object as the reference image of the moving object. (6) Further, the reference moving object fluctuation calculation unit of (3) may calculate the fluctuation (Vrx_n, Vry_n) of the moving object for reference by calculating a flow for the reference image of the moving object from the detected moving object and the reference image of the moving object. (7) Further, the reference moving object fluctuation average value calculation unit of (3) may calculate the average value (Vrx_ave, Vry_ave) of the fluctuation as Vrx_ave=(Vrx_0+Vrx_1+ . . . +Vrx_N−1)/N and Vry_ave=(Vry_0+Vry_1+ . . . +Vry_N−1)/N. (8) Further, the difference flow average value calculation unit of (3) may calculate the average value (Vx_ave, Vy_ave) of the difference flow (Vx_n, Vy_n) as Vx_ave≈Vmx−Vrx_ave and Vy_ave≈Vmy−Vry_ave from the flow (Vmx, Vmy) of the moving object and the average value (Vrx_ave, Vry_ave) of the fluctuation. (9) Further, the moving object flow calculation unit of (3) may calculate the flow (Vmx, Vmy) of the moving object as Vmx≈Vx_ave+Vrx_ave and Vmy≈Vy_ave+Vry_ave from the average value (Vx_ave, Vy_ave) of the difference flow and the average value (Vrx_ave, Vry_ave) of the fluctuation. (10) Further, the moving object heat haze fluctuation calculation unit of (3) may calculate the fluctuation (Vkx_n, Vky_n) due to the heat haze on the moving object as Vkx_n=Vx_n+Vrx_n−Vmx and Vky_n=Vy_n+Vry_n−Vmy from the difference flow (Vx_n, Vy_n), the fluctuation (Vrx_n, Vry_n) and the flow (Vmx, Vmy) of the moving object.

The above embodiment has been described as an example of the monitoring apparatus using the image pickup device such as a camera, but the present invention is not limited thereto and may be applied to an image processing device of various image pickup devices.

While the invention has been shown and described with respect to the embodiments, it will be understood by those skilled in the art that various changes and modification may be made without departing from the scope of the invention.

Industrial Applicability

The present invention is not limited to the monitoring apparatus as described above, and may be widely used to prevent image degradation due to the heat haze in various image pickup devices.

What is claimed is:

1. An image processing device for processing an image captured by an image pickup device for capturing an image of a target area, the image processing device comprising:
   a background object reference image estimation unit configured to estimate a reference image of a background object with no motion based on input images inputted sequentially from the image pickup device;
   a background object optical flow calculation unit configured to calculate an optical flow of the background object by calculating local fluctuations of the input images based on the input images and the reference image of the background object;
   a moving object reference image estimation block configured to estimate a reference image of a moving object with motion based on input images inputted sequentially from the image pickup device;
   a moving object heat haze fluctuation calculation block configured to calculate a fluctuation due to heat haze on the moving object in the input images based on the input images and the reference image of the moving object; and
   a motion correction unit configured to correct the input images by using the optical flow calculated by the background object optical flow calculation unit and the fluctuation due to heat haze on the moving object calculated by the moving object heat haze fluctuation calculation unit to remove the local fluctuations in the input images.

2. The image processing device of claim 1, wherein the moving object reference image estimation block includes a moving object detection unit for detecting the moving object by calculating a difference flow of the input images inputted sequentially from the image pickup device, and a moving object reference image estimation unit for creating an average image of the detected moving object as the reference image of the moving object.

3. The image processing device of claim 2, wherein the moving object heat haze fluctuation calculation block includes a reference moving object fluctuation calculation unit for calculating a fluctuation of a moving object for reference at each point of interest on the moving object, a reference moving object fluctuation average value calculation unit for calculating an average value of the fluctuation of the moving object for reference, a difference flow average value calculation unit for calculating an average value of the difference flow at each point of interest on the moving object, a moving object flow calculation unit for calculating a flow of the moving object, and a moving object heat haze fluctuation calculation unit for calculating the fluctuation due to heat haze on the moving object at each point of interest.

4. The image processing device of claim 2, wherein the moving object detection unit compares a current input image frame with a previous frame which is one frame before the current frame by using a plurality of input image frames stored in time series in a latch to calculate the difference flow and detects the moving object.

5. The image processing device of claim 3, wherein the moving object detection unit compares a current input image frame with a previous frame which is one frame before the current frame by using a plurality of input image frames stored in time series in a latch to calculate the difference flow and detects the moving object.

6. The image processing device of claim 2, wherein the moving object reference image estimation unit extracts the moving object from a current input image frame and a plurality of input image frames stored in time series in a latch, and creates the average image of the extracted moving object as the reference image of the moving object.

7. The image processing device of claim 3, wherein the moving object reference image estimation unit extracts the moving object from a current input image frame and a plurality of input image frames stored in time series in a latch, and creates the average image of the extracted moving object as the reference image of the moving object.

8. The image processing device of claim 3, wherein the reference moving object fluctuation calculation unit calculates the fluctuation of the moving object for reference by calculating a flow for the reference image of the moving object from the detected moving object and the reference image of the moving object.

9. A method of correcting fluctuation of heat haze on a moving object in an image processing device for processing an image captured by an image pickup device for capturing an image of a target area, the method comprising:
- estimating a reference image of a background object with no motion based on input images inputted sequentially from the image pickup device;
- calculating an optical flow of the background object by calculating local fluctuations of the input images based on the input images and the reference image of the background object;
- estimating a reference image of a moving object with motion based on input images inputted sequentially from the image pickup device;
- calculating a fluctuation due to heat haze on the moving object in the input images based on the input images and the reference image of the moving object; and
- correcting the input images by using the calculated optical flow and the calculated fluctuation due to heat haze on the moving object to remove the local fluctuations in the input images.

10. The method of claim 9, wherein said estimating the reference image of the moving object includes detecting the moving object by calculating a difference flow of the input images inputted sequentially from the image pickup device, and creating an average image of the detected moving object as the reference image of the moving object.

11. The method of claim 10, wherein said calculating the fluctuation due to heat haze on the moving object includes calculating a fluctuation of a moving object for reference at each point of interest on the moving object, calculating an average value of the fluctuation of the moving object for reference, calculating an average value of the difference flow at each point of interest on the moving object, calculating a flow of the moving object, and calculating the fluctuation due to heat haze on the moving object at each point of interest.

* * * * *